United States Patent Office 3,661,877
Patented May 9, 1972

---

3,661,877
POLYMERIC COMPOSITIONS AND METHOD OF PREPARATION
Allen C. Bluestein, Succasunna, and Richard F. Grossman, Andover, N.J., assignors to Reichhold Chemicals, Inc., White Plains, N.Y.
No Drawing. Filed May 21, 1970, Ser. No. 39,563
Int. Cl. C08f *15/04, 27/00, 45/02*
U.S. Cl. 260—86.7                                                          15 Claims

ABSTRACT OF THE DISCLOSURE

A heat crosslinkable composition, which comprises about 94% to about 99.5% of a polymer of ethylene and about 6% to about 0.5% of a peroxide blend, both percentages being based upon the total weight of the composition. The peroxide blend consists of about 10% to about 90% of a peroxide with a thermal decomposition temperature of from about 80° to about 148° C. and of about 90% to about 10% of a peroxide with a thermal decomposition temperature of from about 105° C. to about 210° C. Both percentages are based upon the total weight of said blend. The blend provides a crosslinking action which lies between the crosslinking rate of either peroxide alone.

---

The invention relates to the preparation of novel polymeric compositions based on ethylene. More particularly the invention relates to a heat crosslinkable composition, which comprises about 94% to about 99.5% of a polymer of ethylene and about 6% to about 0.5% of a peroxide blend, both percentages being based upon the total weight of the composition. The peroxide blend consists of about 10% to about 90% of a peroxide with a thermal decomposition temperature of from about 80° to about 148° C. and of about 90% to about 10% of a peroxide with a thermal decomposition temperature of from about 105° C. to about 210° C. Both percentages are based upon the total weight of said blend. The blend provides a crosslinking action which lies between the crossliking rate of either peroxide alone.

These compositions comprise polyethylene or copolymers of ethylene, filler and a blend of peroxides or hydroperoxides such that the time-temperature conditions for the crosslinking reaction may be tailored for the individual requirements at hand. This ability to manipulate the time-temperature conditions for crosslinking as desired makes these new peroxide blends highly attractive for commercial processing conditions of ethylene and ethylene copolymers which otherwise cannot be met by the decomposition characteristics of a single known peroxide.

Polymers of ethylene or copolymers containing a major portion of ethylene have been widely used for many years. These uses include use as pipes, various types of containers, covering materials, i.e.: sheets, films; furniture, etc. However, a crosslinked polyethylene or ethylene copolymer is much to be desired. Crosslinked polymers have greatly increased resistance to heat deformation, solvent and chemical attack and have other desirable properties not found in the uncrosslinked state. Commercial use of compositions based on crosslinked polyethylene and ethylene copolymers has become widespread.

These compositions are widely known to the art. They are prepared in the broadest by using polyethylene or copolymers containing a major proportion of ethylene and a minor proportion of one or more other monomers and an inert filler and a crosslinking agent. The compositions are then ready to be formed into the desired shape by the addition of heat and pressure. The range of useful compositions is highly varied and complex and the associated compounding has become a well developed art.

Various methods and agents have been put forth for crosslinking these compositions but by far the most widely used in curing by peroxides.

It is well known that, when heated in hydrocarbon media, organic peroxides decompose thermally as follows:

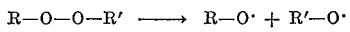

The rate of decomposition has been found to be first order in peroxide, the rate constant being a parameter of the given organic peroxide, dependent on temperature by means of a specific activation energy, and only slightly influenced by the particular hydrocarbon chosen.

It is further well known that the resultant peroxy free radicals will, if sufficiently long lived, abstract hydrogen atoms from nearby hydrocarbon molecules (R—H):

The hydrocarbon radicals which are generated undergo a mixture of crosslinking:

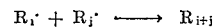

random chain transfer

and disproportionation:

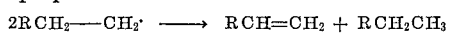

It is also well known that if organic peroxides are thermally decomposed in polymers of, or copolymers containing a major fraction of, ethylene at temperaures above the melting or flow points of such polymers, that the crosslinking reaction tends to predominate.

It is almost always necessary in commercial practice to be able to process the specific crosslinkable composition to its final desired shape and size prior to initiating the decomposition of the organic peroxide. In most commercial processes the manufacture of the end product depends on utilization of the property of ease of deformation of the thermoplastic in the uncrosslinked state with the aid of heat and pressure. This is particularly true when the composition must be molded, extruded, and be stable at temperatures at which these operations are feasible. If premature crosslinking is initiated during such processing operations, thermoplasticity will generally be decreased to the point where economical process speeds will not be possible, and often the appearance and properties of the manufactured article will be adversely affected.

However, on the other hand, in order to achieve comerically feasible process speeds, it is necessary that once the article has been processed to its final shape and then heated above the thermal decomposition temperature of the given peroxide, that crosslinking proceed as rapidly as possible. This is not only to develop favorable economics but to minimize the side reactions given above. In practice, it is found that in order to maximize process speed and minimize power input, a peroxide whose thermal decomposition begins to become noticeable at temperatures of 10° to 20° C. above the melting or flow point of the composition is most advantageous.

A serious problem exists in that there are many time-temperature conditions for the crosslinking reaction in ethylene polymers and copolymers which are highly attractive for commercial processes and which cannot be met by the decomposition characteristics of any known peroxide. There has been an attempt to meet this problem by synthesis and evaluation of many new organic peroxides. The commercialization of these types of exotic reagents has been slow and difficult. This approach is also handicapped by the circumstance that it is not feasible for many manufacturers to evaluate, stock, and use a sizeable array of peroxides for individual purposes.

In practice the above problem is usually approached by attempting to compound a particular composition so that a specific peroxide may be used under a required set of process conditions, or by developing a more or less economical process to accommodate a specific composition employing a predetermined peroxide. These ad hoc approaches are disadvantageous in that they require expenditure of considerable effort and time in each instance, and require the manufacturer of cross-linked ethylene polymer products to maintain either a wide variety of compositions or processes or both to provide a desired line of products. Often this is not possible.

A more generally useful approach would be to modify directly the rate of crosslinking by means of additives. Two methods are known. One is the addition of relative difunctional or polyfunctional unsaturated monomers to the cross-linkable composition. These are more reactive to the preoxy radicals than are saturated hydrocarbons, and function in forming crosslinks to the latter. This method results in an increase in the rate of crosslinking and generally in resultant crosslink density. The second method is to add to the composition minor amounts of materials which react with peroxy radicals but do not function as crosslinking agents, such as nitrites, phosphites, or even standard antioxidant reagents such as amines and phenolic compounds. This results in a decrease in the rate of crosslinking and in crosslink density. Both methods, although effective in controlling rate, are less than satisfactory in that they introduce changes in the ultimate physical properties of the crosslinked compositions, which properties are highly dependent on crosslink density. Further, in many compositions, particularly those used in electrical applications, inclusion of even minor quantities of mobile, relatively polar small molecules is found to have a deleterious effect on the desired properties. Thus there are areas of application where no generally satisfactory solution to the above stated problem has been found.

It is therefore an object of this invention to provide a heat crosslinkable composition based upon polyethylene or copolymers of ethylene.

It is another object of this invention to provide a crosslinkable composition which is crosslinked by using organic peroxides.

A further object of this invention is to provide a means for controlling the rate of crosslinking by organic peroxides.

A still further object of this invention is to provide a means for controlling the rate of crosslinking without affecting the crosslink density of the polymer composition.

These and other objects can be simply achieved by using as the organic peroxide crosslinking agent a blend of selected peroxides and hydroperoxides. It is now found that by using a blend of peroxides or hydroperoxides each having a different decomposition range but that range overlapping in part, an average rate of crosslinking is realized, which does not affect crosslink density.

Organic hydroperoxides, which are a class of compounds will known to provide little or no crosslinking activity in ethylene polymers (see for example U.S. Pat. 2,919,474) are extremely active in suppressing the rate of crosslinking of ethylene polymers by organic peroxides. We also find that the rate of crosslinking provided by a given organic peroxide may be accelerated by addition of a more active peroxide or depressed by the addition of a less active peroxide so as to yield a more or less average rate of crosslinking, despite much previous evidence that the thermal decomposition or organic peroxides in hydrocarbon media is solely temperature dependent. Both of the above effects are found only if the combination of peroxides or peroxide and hydroperoxide is such that the range of thermal decomposition temperatures, in the time scale appropriate to the crosslinking reaction, of each component show some overlap. Further it is found that the use of the combinations showing these unexpected interdependent effects provides no decrease in crosslink density or other desirable properties. Using the combinations of this invention therefore makes possible the provision of a useful peroxide crosslinking system for almost any conceivable time-temperature requirements for the crosslinking reaction.

Experimentally it is found that progressive replacement of an increasing fraction of peroxide by a hydroperoxide having a decomposition range overlapping that of the peroxide, results in a progressive decrease in the rate of crosslinking of ethylene polymers without loss of crosslink density, provided that the reaction is carried to completion. Calorimetric observation indicates simultaneous decomposition of the peroxide and hydroperoxide.

Further they find that progressive replacement of part of a peroxide with a second peroxide having a decomposition range overlapping that of the first but displaced to lower temperatures results in a progressive increase in the rate of crosslinking of polymers and copolymers of ethylene without increase in ultimate crosslink density; whereas replacement by increments of a second peroxide again having an overlapping decomposition range but displaced to higher temperatures provides successive decreases in the rate of crosslinking without loss of crosslink density. In these cases calorimetric observation indicates simultaneous decomposition of both peroxides, or of a complex between them and/or their reaction products. If two peroxides are combined whose decomposition ranges do not overlap, then successive decomposition is found calorimetrically, and a two step crosslinking reaction is observed, the speed of each step being characteristic of the individual peroxide.

Organic hydroperoxides which are useful in the practice of this invention include cumene hydroperoxde (decomposition range 115–170° C.); t-butyl hydroperoxide (decomposition range 105–150° C.), p-menthane hydroperoxide (decomposition range 120–165° C.); 2,5-dimethylhexane-2,5-dihydroperoxide, (decomposition range 135–185° C.); and the like and mixtures thereof. Therefore as can be seen from the foregoing the range of thermal decomposition temperatures of said hydroperoxides is from about 105 to about 185° C.

Examples of useful peroxides which may be used for this invention include t-butyl peroxybenzoate (decomposition range 99–135° C.); dicumyl peroxide (decomposition range 115–160° C.); 2,5-dimethyl-2,5-di-t-butylperoxyhexane (decomposition range 132–185° C.); Bis (t-butyperoxy-isopropyl) benzene (decomposition range 140–185° C.); di-t-butylperoxide (decomposition range 152–200° C.); di-t-butyl perphthalate (decomposition range 108–210° C.); lauroyl peroxide (decomposition range 95–108° C.); benzoyl peroxide (decomposition range 80° C.) methyl ethyl ketone peroxide (decomposition range 92° C.), 3-ethyl-3,6,6,9,9-pentamethyl tetraoxacyclononane (decomposition range 130–190° C.) and 4-methyl-4-t-butylperoxy-2-pentanone (decomposition range 120–165° C.) and the like and mixtures thereof. As can be seen from the above the range of thermal decomposition temperatures of said peroxides is from about 80° to about 210° C.

The crosslinkable polymeric portion of the composition may include polyethylene, ethylene-vinyl acetate copolymers, and ethylene copolymerized with monomers such as propylene, acrylic acid, methacrylic acid, methacrylate, ethyl acrylate, butyl acrylate, methylmethacrylate, ethyl methacrylate and the like and mixtures thereof.

Filler material may be added in amounts ranging from about 1% to 50% based upon the weight of the crosslinkable composition. These may be selected from the group consisting of thermal and furnace process carbon blacks, finely divided silica, magnesium silicate, aluminum silicate, clay, talc, calcium carbonate, and the like and mixtures thereof. Also other polymers may be added in minor fractions such as polyvinyl chloride, polyvinyl chloride-acetate, chlorinated polyethylene and the like and anti-oxidants and stabilizers if required, these being well known to the art.

The resulting crosslinkable composition is especially useful for coating cables, wires and other surfaces. Crosslinkable compositions may have from about 94% to about 99.5% by weight based upon the weight of the total composition of an ethylene polymer and from about 6% to about 0.5% by weight, based upon said composition of a peroxide blend. These compositions may also include from about 1% to about 50% by weight based upon such composition, of aforementioned filler.

The following method was used for determining the decomposition temperature of the organic peroxides by use of differential thermal analysis.

A 50% solution or dispersion of the peroxide in question is made in paraffin oil, which provides a heat transfer medium and simultates a liquid polyethylene. 2-3 mgs. of these solutions are placed in an aluminum dish, approximately 1 cm. in diameter, which is placed in the sample holder of the Perkin-Elmer Differential Scanning Calorimeter (Model DSC-1B manufactured by Perkin-Elmer Corp., Norwalk, Connecticut). An empty dish is placed in the reference holder. The apparatus is allowed to equilibrate at about 50° C. under a slow stream of nitrogen, then is heated at a rate of 10° C. per minute. The difference in electrical input needed to maintain the sample at the same temperature as the reference as the temperature is increasing linearly, is amplified and fed into a millivolt recorder. Thus if the samples go through any physical or chemical change involving a change in enthalpy, a sharp break in the curve is noted. The measurement is essentially that of heat capacity versus temperature. First and second order transitions can be differentiated. Drawing of intersecting slopes yields the point at which the transition begins (at 10° C./min.).

Crosslinking characteristics of the peroxides in polyethylene and related polymers are determined by the following methods.

(1) Determination of Cure Characteristics at 175° C.

The measurement is carried out using a Brabender PlastiCorder (C. W. Brabender Instruments, South Hackensack, N.J.), as well known instrument which measures melt viscosity. A small mixing head resembling a miniature Banbury internal mixer is driven by a dynamometer which measures the back torque exerted by the sample being sheared by the mixing rotors. The mixing head is heated to 175° C. and 40 cc. of polymer, generally as pellets or powder, added. The sample is mixed at a constant rotor speed of 10 r.p.m. until a steady viscosity reading (meter-grams of back torque) is obtained. At this point a given amount of organic peroxide is added. If crosslinking occurs, the melt viscosity of the sample increases to a maximum value. The maximum viscosity obtained is considered a measure of the crosslink density achieved, and the rate of increase in viscosity with time (meter-grams per minute) is taken as a measure of the rate of crosslinking.

In the case of low density polyethylene, a minimum viscosity of about 300-400 meter-grams at 175° C. is considered desirable for commercial processing as is a maximum viscosity of about 1500-2000 meter-grams. The latter represents a state of cure associated with complete insolubility of the vulcanizate in organic solvents, and good chemical resistance. A cure rate of about 200-400 meter-grams per minute is generally considered desirable as representing rates that can be met with commercial curing equipment at reasonable process speeds. Nevertheless, there are a number of special situations wherein it is desired to obtain a broader range of cure rates with a specific polymer, and there are a number of ethylene polymers and copolymers where the above cure rate characteristics cannot be met by existing organic peroxides.

(2) Determination of cure characteristics at 145° C.

The above procedure is repeated at 145° C.

This represents the high end of process temperatures the polymer is likely to see prior to crosslinking; rapid cure at this temperature is highly undesirable in most situations. A minimum viscosity of 350-500 meter-grams is considered desirable. A cure rate of less than 25 and preferably less than 15 meter-grams per minute is desired. The maximum viscosity obtained should be below 1000 and preferably no more than 800 mg. Many organic peroxides which yield suitable cure rates at 175° C. are found to be too active at 145° C. In addition, there are a number of ethylene polymers and copolymers which when mixed with generally useful peroxides such as dicumyl peroxide, show excessive crosslinking at 145° C.

The following examples are for the purpose of illustration only and are not to be construed as limiting this invention to the specific details set forth therein.

Example 1

The mixing head of the Brabender PlastiCorder was brought to 175° C. and 10 r.p.m. rotor speed, and charged with 38 g. (40 cc.) of a general purpose low density polyethylene resin having a density of 0.920 g./cc. and a melt index of 2.0. After the melt viscosity had leveled off at about 400 meter-grams (about 10 minutes of mixing) an amount of peroxide corresponding to the molar equivalent of 1 g. of dicumyl peroxide was added. The following cure rates and maximum viscosities observed:

| Peroxide | Meter-grams/min. cure rate | Meter-grams maximum viscosity |
| --- | --- | --- |
| 1.2 g. 70% t-butyl hydroperoxide | 0 | 400 |
| 1 g. cumene hydroperoxide | 0 | 400 |
| 1 g. p-menthane hydroperoxide | 0 | 400 |
| 0.6 g. 2,5-dimethylhexane-2,5-dihydroperoxide | 0 | 400 |
| 0.5 g. t-butyl peroxybenzoate | 850 | 1,800 |
| 1 g. dicumyl peroxide | 220 | 1,520 |
| 0.6 g. 2,5-dimethyl-2,5-di-t-butylperoxyhexane | 165 | 1,520 |
| 0.6 g. bis(t-butylperoxy isopropyl)benzene | 140 | 1,500 |
| 1 g. di-t-butylperoxide | 125 | 1,390 |
| 2 g. 50% di-t-butyl perphthalate | 440 | 1,580 |
| 1 g. t-butylperoxy trimethylsilane | 30 | 1,120 |

Example 2

The above procedure was repeated using a blend of 1 g. dicumyl peroxide and 1 g. t-butylperoxy trimethylsilane. The former peroxide has a decomposition range of 115 to 160° C. and the latter, 175–210° C., measured calorimetrically. The blend of peroxides gave a two step calorimetric decomposition, at 120–150 and 170–200° C. A cure rate of 208 meter-grams per minute and a maximum viscosity of 1500 meter-grams were obtained, essentially identical to the behavior of pure dicumyl peroxide.

Example 3

The mixing head of the Brabender PlastiCorder was brought to 145° C. and 10 r.p.m. rotor speed. It was charged with 38 g. of the above polyethylene resin and after the viscosity had leveled off at 500–520 meter-grams (after about 18 minutes mixing) the same quantities of the above peroxides were added, and the following cure rates and maximum viscosities observed:

| Peroxide | Cure rate | Maximum viscosity |
| --- | --- | --- |
| 1 g. lauroyl peroxide | 185 | 1,440 |
| 0.5 g. t-butyl peroxybenzoate | 75 | 1,280 |
| 1 g. dicumyl peroxide | 10 | 850 |
| 0.6 g. 2,5-dimethyl-2,5-di-t-butylperoxy hexane | 2 | 550 |
| 0.6 g. bis(t-butylperoxy isopropyl)benzene | 0 | 520 |
| 1 g. di-t-butyl peroxide | 0 | 520 |
| 2 g. 50% di-t-butylperphthalate | 32 | 1,080 |
| 1 g. t-butylperoxy trimethylsilane | 0 | 520 |

Example 4

The procedure of Eample 3 was repeated using a blend of 1 g. dicumyl peroxide and 1 g. t-butylperoxy trimethylsilane. A cure rate of 10 meter-grams per minute and a maximum viscosity of 840 meter-grams were obtained, essentially identical to the behavior of pure dicumyl peroxide.

Example 5

The procedure of Example 3 was repeated using a blend of 0.5 g. t-butylperoxy benzoate and 1 g. to-butylperoxy trimethylsilane. The former peroxide has a decomposition range of 99–135° C. as determined calorimetrically. The blend of peroxides gave a two step calorimetric decomposition at 100–125 and 165–200° C. A cure rate of 75 meter-grams per minute and a maximum viscosity of 1240 meter-grams were obtained, essentially identical to the behavior of pure t-butylperoxy benzoate.

Example 6

The mixing head of the Brabender PlastiCorder was brought to 120° C. and 10 r.p.m. rotor speed. It was charged with 38 g. of the same polyethylene resin and after the viscosity had leveled off at about 500 meter-grams, peroxides were added as indicated and the following cure rates and maximum viscosities observed:

| Peroxide | Meter-grams/min. cure rate | Meter-grams maximum viscosity |
|---|---|---|
| 1 g. lauroyl peroxide | 70 | 1,250 |
| 0.5 g. t-butylperoxy benzoate | 5 | 680 |
| All others given in (1) and (3) above | 0 | 600 |

Example 7

The procedure of Example 6 was repeated using a blend of 1 g. dicumyl peroxide and 1 g. lauroyl peroxide. The latter peroxide has a decomposition range of 95–108° C., determined calorimetrically. The blend of peroxides had a two step decomposition at 92–105 and 112–150° C. A cure rate of 72 meter-grams per minute and a maximum viscosity of 1250 meter-grams were obtained, essentially identical to the behavior of pure lauroyl peroxide.

Example 8

The procedure of Example 6 was repeated using a blend of 1 g. lauroyl peroxide and 0.6 g. 2,5-dimethyl-2,5-di-t-butylperoxy hexane. The latter peroxide exhibits a decomposition range of 132–185° C. The blend of peroxides had a two step decomposition at 98–112 and 124–168° C. A cure rate of 75 meter-grams per minute and a maximum viscosity of 1240 meter-grams were obtained, essentially identical to the behavior of pure lauroyl peroxide.

Example 9

A blend of 0.5 g. of 2,5-dimethyl-2,5-di-t-butylperoxy hexane and 0.4 g. of t-butylperoxy benzoate gave a single decomposition over the range of 120–170° C. At 175° C., this blend yielded a cure rate of 270 meter-grams per minute and a maximum viscosity of 1540 meter-grams. At 145° C., a cure rate of 17 meter-grams per minute and a maximum viscosity of 900 m.-g. were noted. At 120° C., the cure rate was zero. These cure rate characteristics are highly desirable in this particular polyethylene resin and cannot be obtained with either component peroxide; 2,5-dimethyl-2,5 - di-t-butylperoxy hexane giving rather slow cure rates with this resin, and t-butylperoxy benzoate being much too fast for safe processing.

Example 10

A blend of 0.5 g. of bis(t-butylperoxy isopropyl)benzene and 0.25 g. of t-butylperoxy benzoate gave a single decomposition over the range 124–178° C. At 175° C., this blend gave a cure rate of 215 m.-g./min. and a maximum viscosity of 1560 m.-g. At 145° C., this blend gave a cure rate of 13 m.-g./min. and a maximum viscosity of 820 m.-g. At 120° C., the cure rate was zero. These desirable cure rate characteristics cannot be obtained with either pure component.

Example 11

With the above polyethylene resin, at 175° C., 1 g. of the organic peroxide, 3-ethyl-3,6,6,9,9-pentamethyltetraoxacyclononane, gave a cure rate of 78 m.-g./min. with a maximum visc. of 1160 m.-g. This was considered too slow for practical use. The same peroxide, which decomposes over the range 130–190° C., at 145° C. gave a cure rate of 4 m.-g./min. with a maximum viscosity of 650 m.-g. A blend of 1 g. of this peroxide with 0.25 g. t-butyl peroxy benzoate had a single decomposition over the range of 120–170° C. At 175° C., a cure rate of 208 m.-g./min. and a maximum visc. of 1480 m.-g. were obtained. At 145° C., a cure rate of 10 m.-g./min. and a maximum viscosity were obtained. At 120° C., the cure rate was zero. In this case desirable cure rate characteristics were obtained using a blend of peroxides neither of which could be used alone in commercially feasible processes.

Example 12

A copolymer of ethylene and vinyl acetate containing 3.8–4.2% vinyl acetate by weight, and having a density of 0.925 and a melt index of 4.0, was found to have a cure rate according to the procedure of Example 1 of 240 m.-g./min. using 1 g. dicumyl peroxide. In this case, very rapid processing of the polymer is desired and a cure rate of 300–400 m.-g./min. thought necessary. This can be obtained using di-t-butyl perphthalate but only at the expense of processing safety at lower temperatures. At 145° C., the equivalent (to dicumyl peroxide) quantity of this peroxide yielded a cure rate of 48 m.-g./min. and a maximum viscosity of 1470 m.-g. These characteristics would prevent the practical use of this peroxide. It was found that a blend of 0.75 g. dicumyl peroxide and 0.25 g. di-t-butylperphthalate decomposed in a single step over the range of 125–165° C. This blend gave a cure rate at 175° C. of 340 m.-g./min., and a cure rate of 18 m.-g./min. at 145° C. These cure rate characteristics are considered high useful.

Example 13

The procedure of Example 1 was repeated using a blend of 0.75 g. of t-butylperoxy benzoate and 0.375 g. of cumene hydroperoxide. The latter has a decomposition range of 115 to 172° C. The blend gave a single decomposition over the range 120–165° C. At 175° C., a cure rate of 240 m.-g./min. and a maximum viscosity of 1450 m.-g. were obtained. The cure rate at 145° C. was 14 m.-g./min. with a maximum viscosity of 840 m.-g. Cure rate at 120° C. was zero. In this case desirable cure rate characteristics were obtained despite the unsuitability of either pure component for the cross-linking of polyethylene.

Example 14

Example 13 was repeated using p-menthane hydroperoxide in place of cumene hydroperoxide. This hydroperoxide has a thermal decomposition range of 120–165° C. The blend as above had a single decomposition over the range 125–170° C. The cure rate data was identical to that of Example 13.

Example 15

With the above polyethylene resin, at 175° C., 1 g. of the organic peroxide, 4-methyl-4-t-butylperoxy-2-pentanone, gave a cure rate of 84 m.-g./min. with a maximum viscosity of 1240 m.-g. This was considered unacceptably slow. This peroxide, which decomposes over the range of 120–165° C., at 145° C. gave a cure rate of 6.5 m.-g./min. with a maximum viscosity of 680 m.-g. A blend of 0.8 g. of this peroxide with 0.2 g. t-butylperoxy benzoate exhibited combined decomposition over the range of 115–

165° C. At 175° C., a cure rate of 232 m.-g./min. and a maximum viscosity of 1530 m.-g. were obtained. At 145° C., a cure rate of 12.5 m.-g./min. and a maximum viscosity of 820 m.-g. were obtained. At 120° C., the rate of cure was zero. These characteristics are considered commercially useful.

The invention has been described in detail for the purpose of illustration, but it will be obvious to those skilled in the art that numerous modifications and variations may be resorted to without departing from the spiirt of the invention in its broadest aspects.

What is claimed is:

1. A crosslinkable composition comprising (A) from about 94% to about 99.5% by weight, based upon such composition, of a crosslinkable polymer of ethylene and (B) from about 6% to about 0.5% by weight, based upon said composition, of a blend consisting of (1) from about 10% to about 90% by weight, based upon such blend, of an organic peroxide having a thermal decomposition temperature ranging from about 80° C. to about 148° C. and (2) from about 90% to about 10% by weight, based upon said blend, of an organic peroxide having a thermal decomposition temperature ranging from about 105° C. to about 210° C., said organic peroxide (1) and organic peroxide (2) having different decomposition temperatures such decomposition temperatures ranging from about 80° C. to about 210° C. and thus overlapping in part and thereby providing a crosslinking rate between the crosslinking rate of an equal quantity of said organic peroxide (1) and said organic peroxide (2).

2. The composition according to claim 1 wherein (A) is at least one member selected from the group consisting of polyethylene, ethylene-vinyl acetate copolymers, ethylene-acrylic ester copolymers and ethylene-methacrylic ester copolymers.

3. The composition according to claim 1 wherein (A) has from about 1% to about 50% by weight of a filler added.

4. The composition according to claim 1 wherein (1) is t-butylperoxy benzoate.

5. The composition according to claim 1 wherein (1) is di-t-butyl perphthalate.

6. The composition according to claim 1 wherein (2) is 2,5-dimethyl-2,5-di-t-butylperoxyhexane.

7. The composition according to claim 1 wherein (2) is bis(t-butyl-peroxyisopropyl)benzene.

8. The composition according to claim 1 wherein (2) is e-ethyl-3,6,6,9,9-pentamethyltetraoxacyclononane.

9. The composition according to claim 1 wherein (2) is 4-methyl-4-t-butylperoxypentanone.

10. The composition according to claim 1 wherein (2) is from about 10% to about 90% by weight of an organic hydroperoxide having a thermal decomposition temperature ranging from about 105° C. to about 185° C.

11. The composition according to claim 10 wherein the hydroperoxide is tert-butyl hydroperoxide.

12. The composition according to claim 10 wherein the hydroperoxide is cumene hydroperoxide.

13. The composition according to claim 10 wherein the hydroperoxide is p-menthane hydroperoxide.

14. The composition according to claim 10 wherein the hydroperoxide is 2,5-dimethylhexane-2,5 dihydroperoxide.

15. A method of preparing a crosslinkable composition according to claim 1 comprising mixing with agitation at a temperature ranging from about 110° C. to about 140° C. (A) from about 94% to about 99.5% by weight, based upon such composition, of a crosslinkable polymer of ethylene and (B) from about 6% to about 0.5% by weight, based upon said composition, of a blend consisting of (1) from about 10% to about 90% by weight, based upon such blend, of an organic peroxide having a thermal decomposition temperature ranging from about 80° C. to about 148° C. and (2) from about 90% to about 10% by weight, based upon said blend, of an organic peroxide having a thermal decomposition temperature ranging from about 105° C. to about 210° C., such blend (B) providing a crosslinking rate between the crosslinking rate of an equal quantity of said organic peroxide (1) and said organic peroxide (2).

References Cited
UNITED STATES PATENTS

| | | | |
|---|---|---|---|
| 3,079,370 | 2/1963 | Precopio et al. | 260—94.9 |
| 3,214,422 | 10/1965 | Mageli et al. | 260—94.9 |

JOSEPH L. SCHOFER, Primary Examiner

J. KIGHT, Assistant Examiner

U.S. Cl. X.R.

260—41 C, 87.3, 88.2 R, 94.9 GA